United States Patent
Khan et al.

(10) Patent No.: US 6,684,159 B2
(45) Date of Patent: *Jan. 27, 2004

(54) MAPPING SUBSURFACE OPEN FRACTURES IN A RESERVOIR USING A SURFACE IMPULSE AND A DOWNHOLE VIBRATORY SOURCE

(75) Inventors: Tawassul Ali Khan, Cypress, TX (US); Sofia Khan McGuire, Houston, TX (US)

(73) Assignee: Tawassul A. Khan, Cypress, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/036,225

(22) Filed: Jan. 3, 2002

(65) Prior Publication Data
US 2003/0125879 A1 Jul. 3, 2003

(51) Int. Cl.⁷ .............................. G06F 19/00; G01V 1/00
(52) U.S. Cl. ............................................ 702/16; 367/57
(58) Field of Search ................................ 702/16; 367/57

(56) References Cited

U.S. PATENT DOCUMENTS

| | | | | |
|---|---|---|---|---|
| 4,783,771 A | * | 11/1988 | Paulsson | 367/57 |
| 5,740,125 A | * | 4/1998 | Chon et al. | 367/75 |
| 5,963,508 A | * | 10/1999 | Withers | 367/38 |
| 6,055,482 A | * | 4/2000 | Sudhakar et al. | 702/16 |
| 6,175,536 B1 | * | 1/2001 | Khan | 367/32 |

* cited by examiner

Primary Examiner—John Barlow
Assistant Examiner—Taon M Le
(74) Attorney, Agent, or Firm—Nonlinear Seismic Imaging Inc.; Tawassul A Khan; Sofia K. McGuire

(57) ABSTRACT

A method for determining the location and the orientation of the open natural fractures in an earth formation from the interaction of the two seismic signals, one signal transmitted into the formation from one wellbore and the second signal transmitted from the surface of the earth, the interaction of the two seismic signals as they simultaneously propagate through the fractured space is recorded in the second wellbore. The seismic signal transmitted from the surface is a lower frequency acoustic pulse of large amplitude identified as 'modulation' wave and the signal transmitted from the wellbore is a higher discrete frequency seismic signal, identified as 'carrier' wave. The interaction of the 'carrier' wave during the compression and rarefaction cycles of the 'modulation' signal is recorded. By subtracting the 'carrier' from the interaction signal, the 'modulation-pulse', which represents the arrival time of the surface generated acoustic pulse, from the surface source to the subsurface fractures is extracted. By plotting the arrival times and the relative amplitudes of the 'modulation-pulse', the orientation and the location of the open fractures is determined.

8 Claims, 7 Drawing Sheets

MAPPING SUBSURFACE OPEN FRACTURES IN A RESERVOIR USING A SURFACE IMPULSE AND A DOWNHOLE VIBRATORY SOURCE

BACKGROUND OF THE INVENTION

1. Field of Invention

The present invention relates to mapping the open natural fractures in the petroleum reservoirs, more particularly identifying their location and their orientation in the existing oil fields.

2. Description of the Prior Art

In most of the carbonate and certain sandstone reservoirs, natural fractures are encountered that are open and control the directional permeability and the effective flow pathways for the hydrocarbons. Mapping these fractures and their orientation is the key to the economic recovery of hydrocarbons from these reservoirs. At present, natural fracture characterization is of increasing importance, since the industry is venturing into increasing their producible reserves from the existing fields that are showing production decline.

Natural fractures in the subsurface rocks are usually vertical and are mostly found in the formations that have gone through structural deformation or have experienced regional stresses. These fractures commonly terminate at lithologic discontinuities within the reservoir formations. These fractures can be closely or widely spaced and irregularly distributed. Quite often, swarms of fractures are encountered with unfractured intervals in between. Economic hydrocarbon production from the fractured reservoirs requires an optimal access of the wellbore to the open fractures. This makes it extremely important that an accurate map of the open fracture system should be available prior to any field infill and development program.

In many cases, fractures are difficult or impossible to map adequately by using currently available technologies. Physical measurements through cores and well logs are limited to the vicinity of the wells drilled in the reservoir. The density of sampling the reservoir rock using cores and well logs quite often is not sufficient to provide any useful information regarding the orientation and the location of the fractures. This is due to two main characteristics of the majority of the wells that are drilled:

1) Both the wells and the fractures are generally vertical and parallel to each other; and
2) The wellbore is smaller than the fracture spacing between the larger fractures.

Horizontal drilling—where the cost of drilling a well is high—has to be designed to take the full advantage of the natural fractures that are open, by mapping their location and their orientation. Since a single horizontal well is limited in producing from a few layers of the reservoir, it is important to identify the part of the reservoir from which the production can be optimized, prior to drilling the well. This requires that the specific fractured beds should be identified prior to any drilling commitments.

This invention uses the measurements of the nonlinearity of the fractured rocks to the seismic waves that are transmitted through them. Two seismic signals are used. One is a high-frequency seismic signal ('carrier' wave) transmitted from a wellbore, which penetrates the reservoir and travels through the fractured rock and is recorded by the receivers in another well. The second is a seismic impulse that is generated using a surface source. The seismic impulse can be generated using marine water or air-guns for offshore seismic methods, and land seismic impulsive sources like dynamite charges or weight drops for land seismic operations.

The stress generated by the high-powered compressional pulse alters the opening of the fracture or of a conductive subsurface fault. The changes in the width opening of the fracture or a subsurface conductive fault, due to fracture nonlinearity, change the transmission properties of the high frequency 'carrier' wave. Observing the changes in the phase and the amplitude of the 'carrier' wave, one can detect the presence of the fractures and their location. Since the change in the amplitude of the 'carrier' wave signal is coincident with the arrival of the acoustic pulse at the fracture, it provides us the travel time of the seismic acoustic pulse from the surface source to the subsurface fracture location. The surface source can be deployed in any surface pattern of source locations and the travel times measured, thus providing us the location of the subsurface fracture or a conductive fault. The maximum stress across the open fracture is related to the direction of arrival of the seismic acoustic pulse. The stress is maximum when the acoustic pulse arrives at the fracture at near right angles to the fracture orientation, and minimum when the acoustic pulse arrives parallel to the fracture orientation or in the same plane as the fracture itself.

By moving the surface source, which could be a marine vessel that is equipped with air-guns or water-guns, or a dynamite charge deployed for land seismic that can be detonated at any surface location, recordings can be made at different surface locations and measurements of the amplitude and the phase changes of the 'carrier' wave made, to determine the orientation and the location of the fractures.

Since practically all the subsurface fractures are vertical, the fracture width of the open fractures is not affected when the surface source is directly above them. The change in the width of the fracture is maximum when the surface source is at or near right angles to the fractures and at a distant offset, so that the 'modulation' seismic impulse is arriving at the fracture at a wide angle.

Once the fracture orientation is established, their location can be determined by moving the surface source in a straight line at right angles to the fractures. The arrival times from the surface source to the subsurface fracture are determined and calculations made to map the fracture location.

SUMMARY OF THE INVENTION

Briefly, the present invention provides a new and an accurate seismic method of mapping the orientation and location of the open natural fractures that are common in the hydrocarbon reservoirs. Two discrete seismic signals are used One is a high frequency signal interference to in the description as a 'carrier' signal which is in the order of ten times higher frequency than the highest frequency in the acoustic pulse which is termed as a 'modulation' signal. The 'carrier' signal is transmitted using a seismic source located in a wellbore with multiple receivers located in an adjacent wellbore. More than one wellbore can be used for receivers to listen simultaneously and each wellbore can have multiple receivers, each receiver with independent output. The borehole source can be moved up and down in the wellbore to cover different formations in the reservoir that may be fractured.

The lower frequency seismic impulse source is located on the surface and can be easily deployed in any geometric pattern that is considered necessary to map the location and orientation of the fractures. Normally the surface sources can transmit higher energy seismic signals compared to the downhole transmitter, their signal strength can be in the order of one hundred times larger. Additionally, the lower frequencies are less attenuated as they travel through the earth. So the level of the 'modulation' signal available at the subsurface fractures can be very much larger than the high frequency 'carrier' generated by the downhole source.

Experiments in rocks show a large nonlinear elastic wave response, far greater than that of gases, liquids, and most other solids. The large response is attributed to structural discontinuities in the rocks such as fractures (P. A. Johnson and K. R. McCall, Los Alamos National Laboratory, Los Alamos, N.Mex.). This nonlinear wave behavior implies that as the seismic wave propagates through the rock there is a local increase in the density and modulus during compression and a local decrease in density and modulus during rarefaction. This generates an elastic nonlinear behavior of the rock and causes interaction between acoustic signals, which propagate through the rock simultaneously. This effect is cumulative in a fractured rock.

A large amplitude, low frequency acoustic impulse squeezes the open fractures during the compression cycle and opens them during the rarefaction cycle. The transmission of the 'carrier' wave through the swarm of fractures is affected by the compression and rarefaction cycles of the 'modulation' wave. Since the frequency of the 'carrier' wave is higher by roughly a factor of 10 or more, and the signal strength of the low frequency 'modulation' wave is considerably stronger. The interaction of the two can be measured. This interaction of the two waves as they are transmitted through multiple open fractures produces amplitude and phase changes in the 'carrier' wave. The effect, as the seismic signal travels through multiple fractures of a swarm is cumulative.

The changes in the amplitude and the phase of the 'carrier' wave due to the nonlinear changes of the transmission characteristics of the fractures when the fractures are squeezed by the acoustic impulse are measured. These changes in the amplitude and phase of the 'carrier' wave are indicative of the angle at which 'modulation' wave is intersecting the fractures. Maximum changes in the amplitude and the phase will occur when 'modulation ' wave is at right angles to the fractures and zero or near zero difference when the 'modulation' signal is arriving from directly above or at a direction that is parallel to the fractures.

The measurements and the analyses of the 'carrier' wave signals recorded by the receiver array and transmitted by the downhole source are made for all the downhole source locations. The output from each source location is recorded by the receiver array, which may be 100 independent receiver signals, sampling the receiver well every 5 or 10 feet. The receiver array is designed to be long enough to provide the vertical coverage for the formations of interest. Each data set, when completed, will be a matrix 'n' number of downhole source locations 5 feet or 10 feet apart recorded in all the receivers in the receiver array, that may be 100 independent receiver signals. The 'n' number of downhole source locations will be enough to vertically sample the formations that are part of the reservoir suspected to have open fractures.

This whole recording procedure is repeated for multiple surface source locations, deployed in a geometric pattern. For this description, a simple pattern is used to explain the concept, in real life any other suitable pattern can be designed; the knowledge for such a design is known in the current art.

DESCRIPTION OF THE PREFERRED EMBODIMENT

Figure 1:
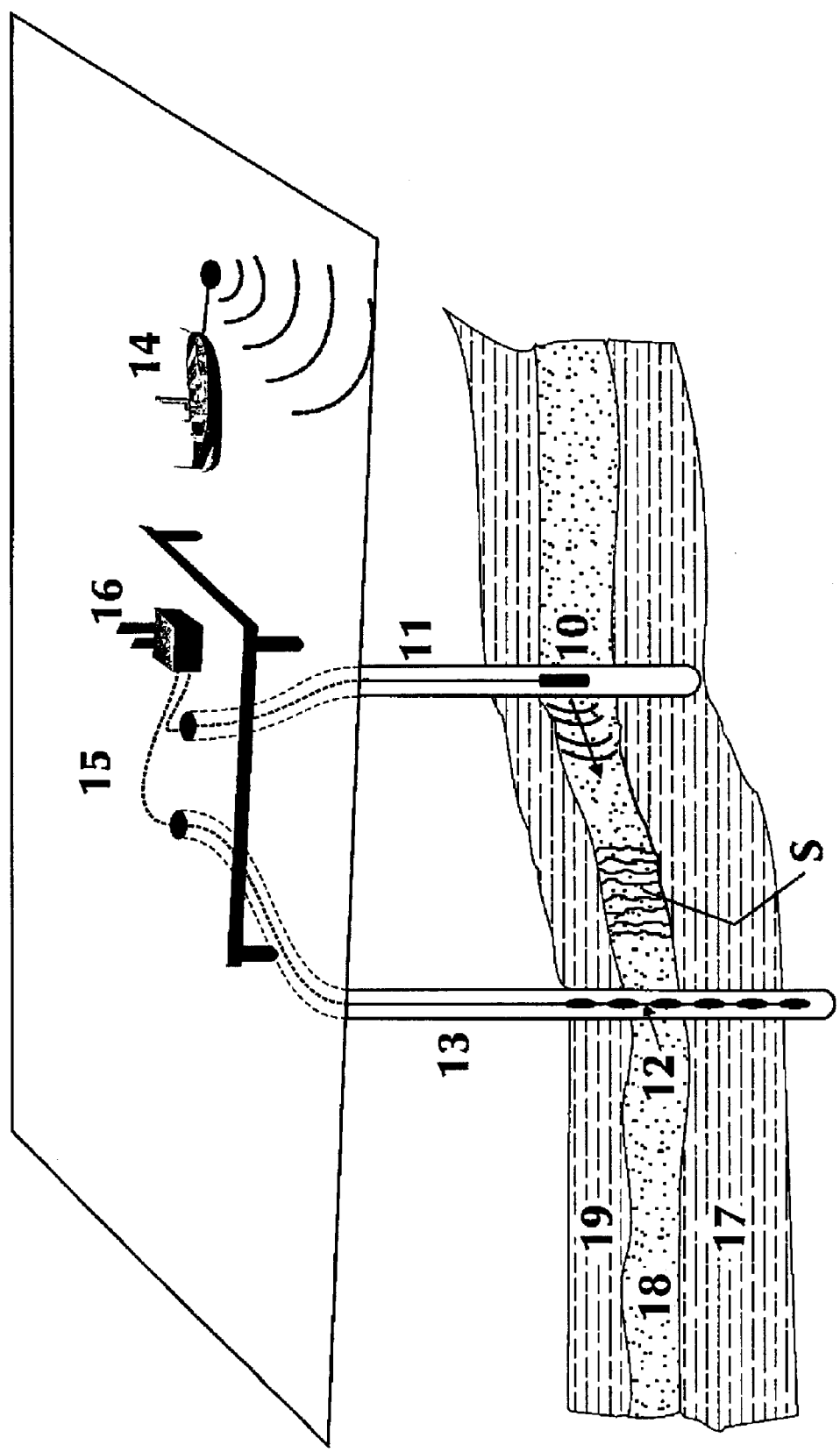
FIG. 1 is a schematic diagram that illustrates a marine field recording operation according to the present invention.

In the drawings, basic concept of the field recording for fracture detection in accordance with the present invention is shown with a simple schematic at FIG. 1.

Downhole seismic source 10 is shown positioned at a selected depth in the source well 11, drilled through the reservoir composed of 17, 18, and 19 reservoir formations. An array of seismic receivers 12 is located at selected depths in the receiver well 13. The wellheads for well 11 and 13 are located on a marine platform 15, and both wells can be accessed from that platform.

The downhole seismic source 10 is capable of transmitting discrete seismic frequencies over a broad seismic frequency range, 100 to 2,000 Hz. The source 10 can be deployed from the surface and positioned at any desired depth using control and recording equipment 16 that is known in the art. The swarm of fractures to be mapped, are shown as S in the formation 18.

For this application a discrete preselected frequency is used, for instance, a sinusoidal frequency of 1,000 Hz. The design of the source has to be such that the distortion of the output signal 1,000 Hz is in the order of −60 DB.

The second well that has receivers 13 can be located, nominally from a few hundred to several thousand feet from the source well 11, and as shown in FIG. 1 penetrating the reservoir formations 17, 18, and 19. A downhole receiver array 12 with individual receivers, whose output can be recorded separately, is deployed in receiver well 13. The deployment and the recording of the output of the receivers 12 can be done and controlled from the surface control equipment 16 known in the art. The distortion of the receivers and the recording equipment has to be in the order of −80 DB.

A marine seismic vessel 14 known in the current art is deployed on the surface. The marine seismic vessel 14 is free to be positioned to transmit a seismic acoustic pulse, the frequency bandwidth of the seismic pulse in the range of 5 Hz to 100 Hz. The marine vessel can be deployed from one location to the next in any desired pattern. The marine source 14 and downhole source 10 can be synchronized to transmit their signals simultaneously. If necessary their starting times can be adjusted to some predetermined value, according to the well spacing between 11 and 13, the depth of the reservoir formations 17, 18, and 19 and the offset distance of the surface source 14 from the wells 11 and 13. For this example both sources are synchronized to start at the same time, which is referenced as zero time. Anyone familiar with current seismic data acquisition for 3D seismic or vertical seismic profiling can make those necessary adjustments.

The downhole source 10 is deployed at regular depth intervals in the order of 5 feet to 10 feet to cover vertically the reservoir formations 17, 18, and 19. In the receiver well 13, a downhole receiver array that may have 100 receivers is positioned to vertically sample the reservoir formations 17, 18, and 19 at 5 feet to 10 feet spacing to match the vertical resolution of the downhole source 10. The selection of the vertical sampling is based on the available geologic information and the bed thickness of 17, 18, and 19 formations.

In the current available art, receiver arrays with 100 receivers each providing a separate output are available. The receiver array 12 could be such an array where receivers are spaced 5 feet to 10 feet apart, thus covering the whole zone of interest in the reservoir, the formations 17, 18, and 19.

The downhole source 10, which is a vibratory source currently available in the industry, transmits a seismic signal that is a discrete frequency 1000 Hz, five to six seconds duration. First set of recording is made without the marine source 14 being activated. For the second set of recordings, downhole source 10 is activated with identical transmission signal as for the first set of recording, but this time the marine source 14 is also activated at location 20, FIG. 2, to generate a seismic impulse signal in synchronization with the downhole source 10. The data are recorded during both the first and second phase of recordings by the downhole receiver array 12 with 100 or similar, independent recording channels in the receiver well 13. The downhole source 10 is moved 5 feet or 10 feet according to the vertical resolution selected, and the recording procedure is repeated, of transmitting 1000 Hz during the first phase of recording without activating the surface marine source 14 and the second time with the surface source 14 being activated. The number of recordings necessary to vertically cover the zone of interest in the reservoir formations, 17, 18, and 19 are made. Once this sequence of recording is completed, the surface source 14 is moved to the next location 21 (FIG. 2).

After the first set of data recorded for the first surface location 20 (FIG. 2), it is not necessary to record the crosswell data using downhole source 10 alone. For all the other surface locations, both source 10 and source 14 are activated simultaneously.

Figure 2:
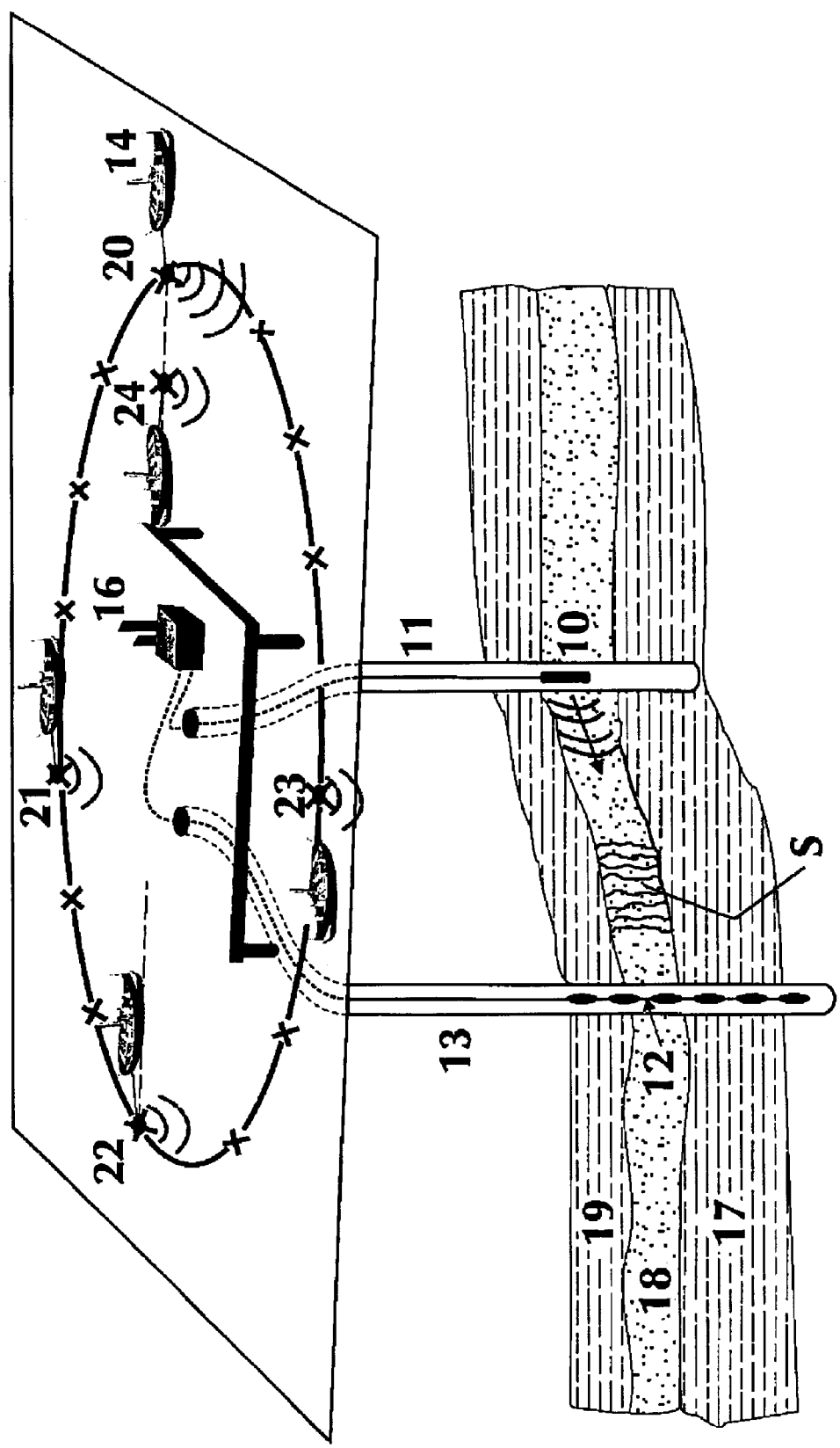
FIG. 2 shows the deployment pattern of a marine air-gun or water-gun source to map the orientation and location of the fractures.

FIG. 2 shows a brief schematic of the deployment concept of the marine source 14. In most cases the location and the orientation of the fractures is not known. This invention relates to detecting the location and orientation of the open fractures by modulating the fracture width with a marine seismic impulse source 14 and measuring the changes in the transmission response of the high frequency 'carrier' wave during the compression and rarefaction cycles of the lower frequency acoustic impulse. The maximum change in the fracture width will occur when the acoustic impulse arrives at or near right angles to the fractures. There will be a zero change in the open fracture width when the acoustic impulse arrives parallel to the fractures or from directly above them. For this reason, surface source 14, which generates the lower frequency acoustic impulse is deployed in a geometric pattern, on surface locations 20, 21, 22, 23 and 24. However depending on the need for accuracy in determining the fracture location and orientation, any suitable surface pattern can be designed. The design capability for such a pattern is available in the current art.

For each location 20, 21, 22, 23 and 24 of the surface source 14, a complete set of recordings using downhole source 10, that are required vertically to cover the formations 17, 18, and 19, are made. The surface source pattern is not limited in any way and may have any number of surface source locations in any geometric pattern deemed necessary to map the fracture location and their orientation. During the first phase of recording, only the downhole source 10 is activated and the outputs of the receiver array 12 are recorded. During this phase of recording, source 10 is moved vertically every 5 feet or 10 feet to cover the zone of interest in the reservoir formations 17, 18, and 19. Once this phase of recording is completed another data set is recorded, where both the marine source 14 and downhole source 10 are simultaneously activated. At each location of the marine surface geometric pattern, data set is recorded, where the downhole source moves vertically with 5 feet to 10 feet spacing to cover the formations 17, 18, and 19. For each of these recordings, surface source 14 and downhole source 10 are activated simultaneously.

During the first phase of recording one set of data are recorded where the surface source 14 is not activated, only the downhole source 10 transmitted its 'carrier' signal which is recorded by receivers 12. This data set is used as a reference during data processing and analysis.

Figure 3:
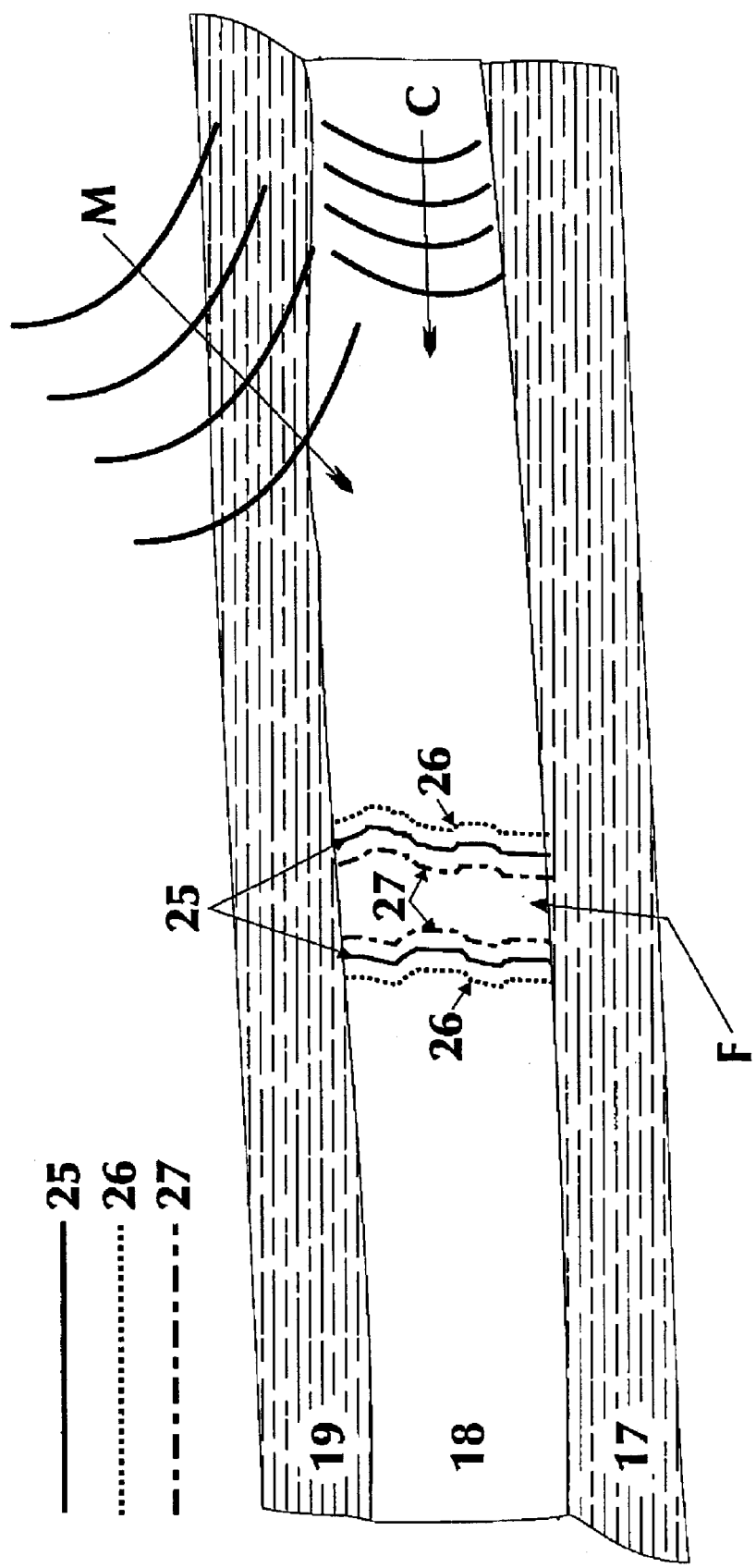
FIG. 3 is a schematic that illustrates the effect of the marine acoustic impulse that is acting as a 'modulation' wave on the open fractures in the reservoir. During the compression cycle of the acoustic pulse the open fracture is squeezed and during the rarefaction cycle of the acoustic pulse the fracture is opened. The transmission of the 'carrier' wave through the fractures is affected by the compression or rarefaction cycles of the acoustic pulse.

FIG. 3 illustrates the changes in the width of an open fracture F when the acoustic impulse that is acting as a 'modulation' wave M, arrives at a wide angle nearer to 90 degrees from the vertical. The angle could be in the order of 45 to 60 degrees. Open fracture is compressed to position 27 during compression cycle of the 'modulation' wave and open to position 26 during rarefaction cycle of the 'modulation' wave. Since 'modulation' wave is a lower frequency impulse its wavelength is in the order of a thousand feet. So the compression and rarefaction cycles can cover a swarm of fractures that may spread over a few hundred feet. The phase and the amplitude of the high frequency 'carrier' wave C, as it travels through the fractures, changes during the compression and the rarefaction cycles of the 'modulation' wave M.

Figure 4:
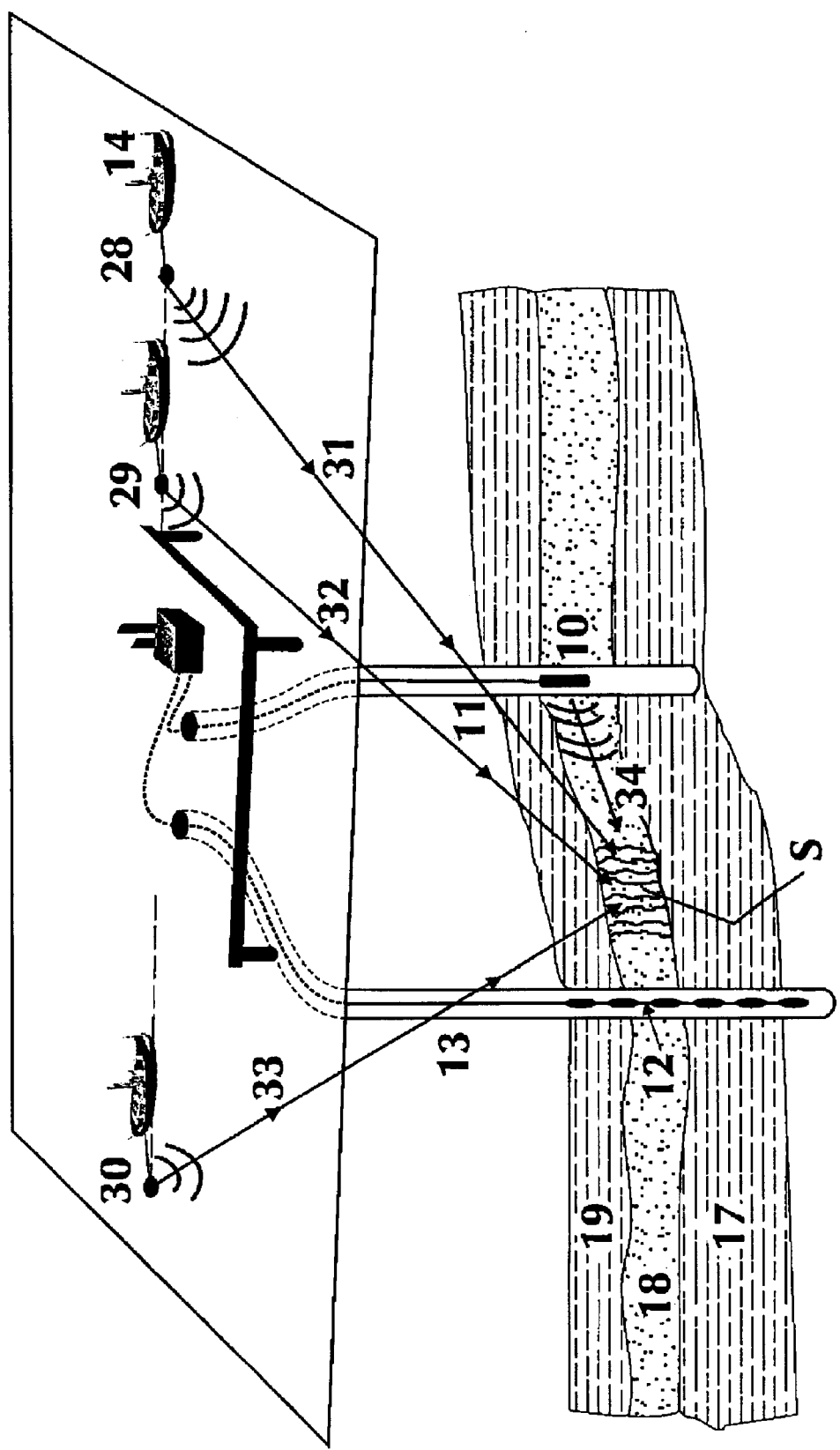
FIG. 4 is a simplified schematic that shows the arrival times of the marine acoustic pulse from the marine source to the subsurface fracture as the marine source moves from one surface location to the next.

FIG. 4 illustrates that the subsurface fractures are at a fixed location in relationship to the well locations of the wells 11 and 13. The variable is the location of the marine source 14, which moves from one surface location to the next, the movement of the source from one location to the next, changes the distance between the marine source and the subsurface fractures. As the marine source 14 generates an acoustic impulse at location 28, the travel distance between the source and the fractures is 31. When the source moves to locations 29 and 30, the travel distance changes to 32 and 33 respectively. Depending on the seismic velocity, the arrival times will be different as the marine source moves to different locations. If we can determine the arrival times from each different predetermined source location to the subsurface fractures, and the seismic velocity field is known from the well logs of the wells 11 and 13, then the distances from the source locations to the fractures can be calculated, and the location of the fractures determined.

Figure 5:
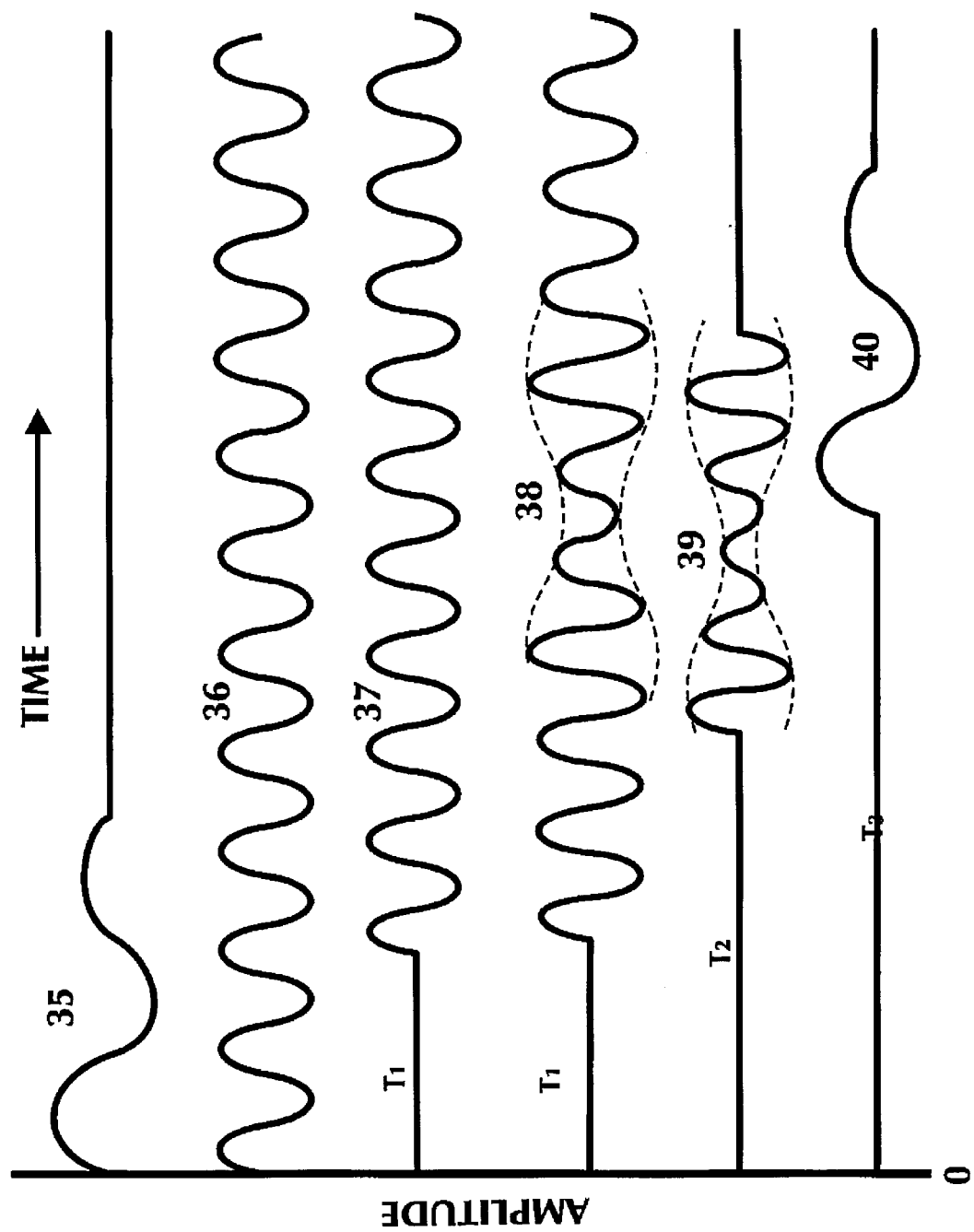
FIG. 5 is a display that shows the acoustic pulse generated by the marine source, and the 'carrier' signal transmitted by the downhole source. The illustration also shows the result of the interaction of the 'carrier' wave and the acoustic pulse generated at the surface as both signals propagate through open fractures. The figure also displays, how the arrival time of the acoustic pulse at the fractures can be determined.

FIG. 5 illustrates how the arrival times of the seismic signal transmitted from the marine source to the fracture location is determined. The acoustic impulse generated by the marine source is shown as 35, the start of the pulse is referred to as time zero. The signal generated by the downhole source, which is a mono-frequency seismic signal is shown as 36, its start time synchronizes with the start time of the seismic pulse 35. A typical 'carrier' signal recorded by the receiver array 12, when the surface marine source is not activated, is displayed as 37, shows the travel time from the source location in the source well 11 to the receiver location in the receiver well 13. The travel time is identified as T1. When the surface source is activated and the acoustic pulse is generated, it modulates the open fractures, and the 'carrier' signal is modified as shown by 38. If we subtract 37, the 'carrier' signal, from 38, the 'modulated carrier' signal, we will get the 'modulation-pulse', displayed as 39. The onset of this pulse provides us the travel time of the seismic signal transmitted from the marine surface source to the fracture location. The travel time is shown as T2. The acoustic signal generated from the surface source and recorded by one of the receiver channel in the receiver array 12 is shown as 40. This is a filtered output of the received signal where the higher frequencies of the 'carrier' wave have been filtered out. The onset of the 'filtered-pulse' is shown as T3, and represents the travel time from the surface source to that particular receiver depth. Based on this travel time information the seismic velocity can be calculated. The velocity field can be measured from different surface locations to different receiver depths.

If we go back to FIG. 4, we can see that when the source 10 and the receivers of the receiver array 12 are located in the unfractured formations 17 and 19, the 'carrier' signal will not be transmitted through the swarm of fractures S; as a result the seismic impulse generated from the surface marine source in location 28, 29, and 30 will not modulate the 'carrier' signal recorded by the receivers located in the respective unfractured formations. The strength of the modulation of the 'carrier' signal caused by the surface generated seismic impulse will be most prominent when the source 10 and the receivers of the receiver array 12 are both located in the fractured formation 18. By using the method of detecting and determining the travel times T2 (FIG. 5), for different surface locations of the marine source 28, 29 and 30, and calculating the velocities from the travel time T3 (FIG. 5), the fracture location can be determined.

Figure 6:
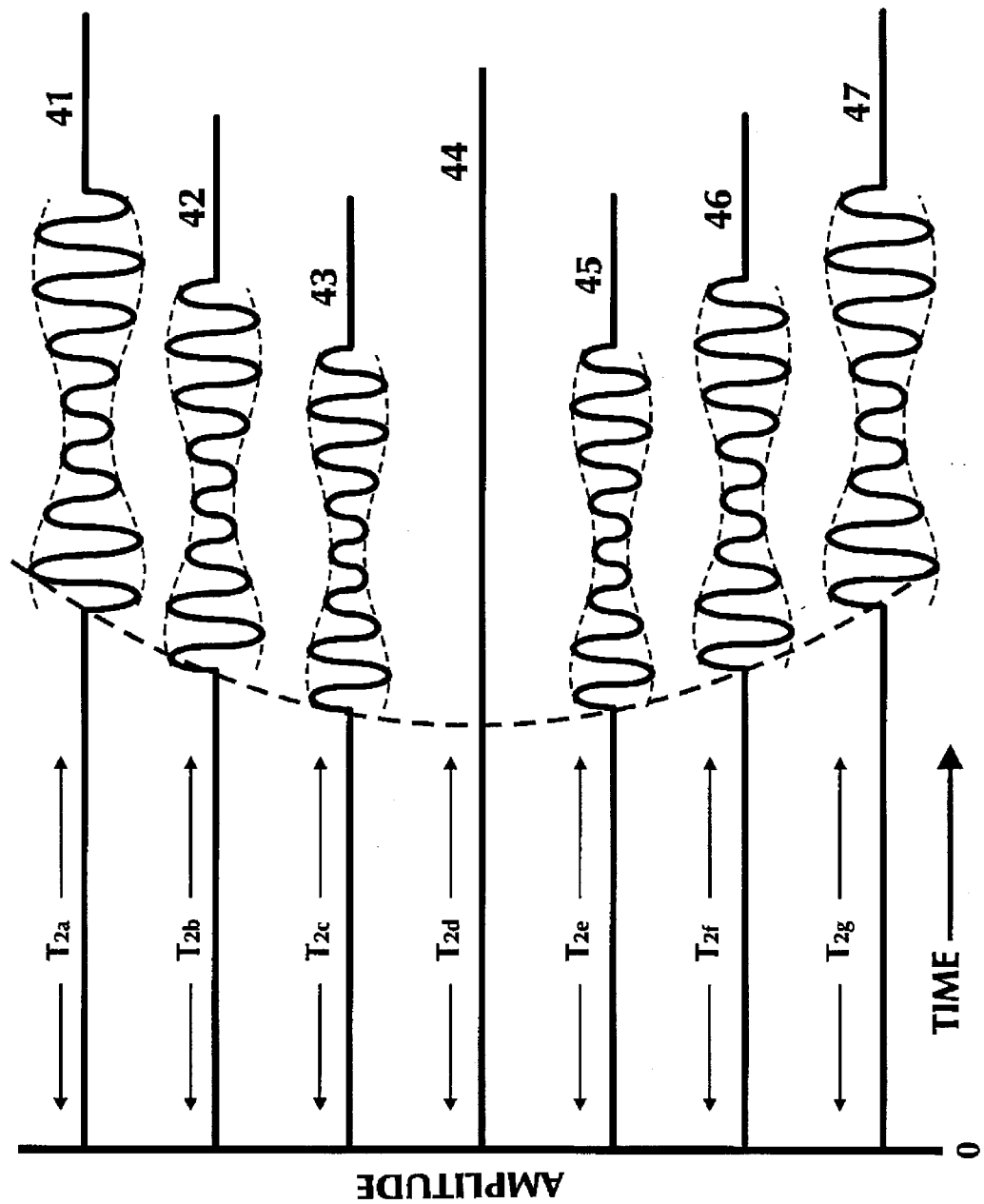
FIG. 6 is a simple display of the arrival times of the acoustic pulse to the fractures, for different surface source locations.

FIG. 6 illustrates different arrival times T2 of the seismic acoustic pulse that is generated by the surface marine source as it arrives at the swarm of open fractures in the fractured reservoir formation 18. Traces 41, 42, 43, 44, 45, 46, and 47, show different arrival times T2a, T2b, T2c, T2d, T2e, T2f, and T2g, respectively. The differences in the arrival times are directly related to the position of the marine surface source in relationship to the swarm of subsurface open fractures in the reservoir formation 18. Note that when the marine source is directly above the open fractures there will be no 'modulation' signal since the open fracture width will not change. There will be no interaction between the 'carrier' and the surface generated seismic impulse, when the acoustic pulse is arriving at the fractures vertically or along the plane of the fractures. The methods of calculating a subsurface location when the arrival times and the seismic velocity field is known are well understood in the seismic industry and are being generally practiced, and need not be discussed here in detail.

Figure 7:
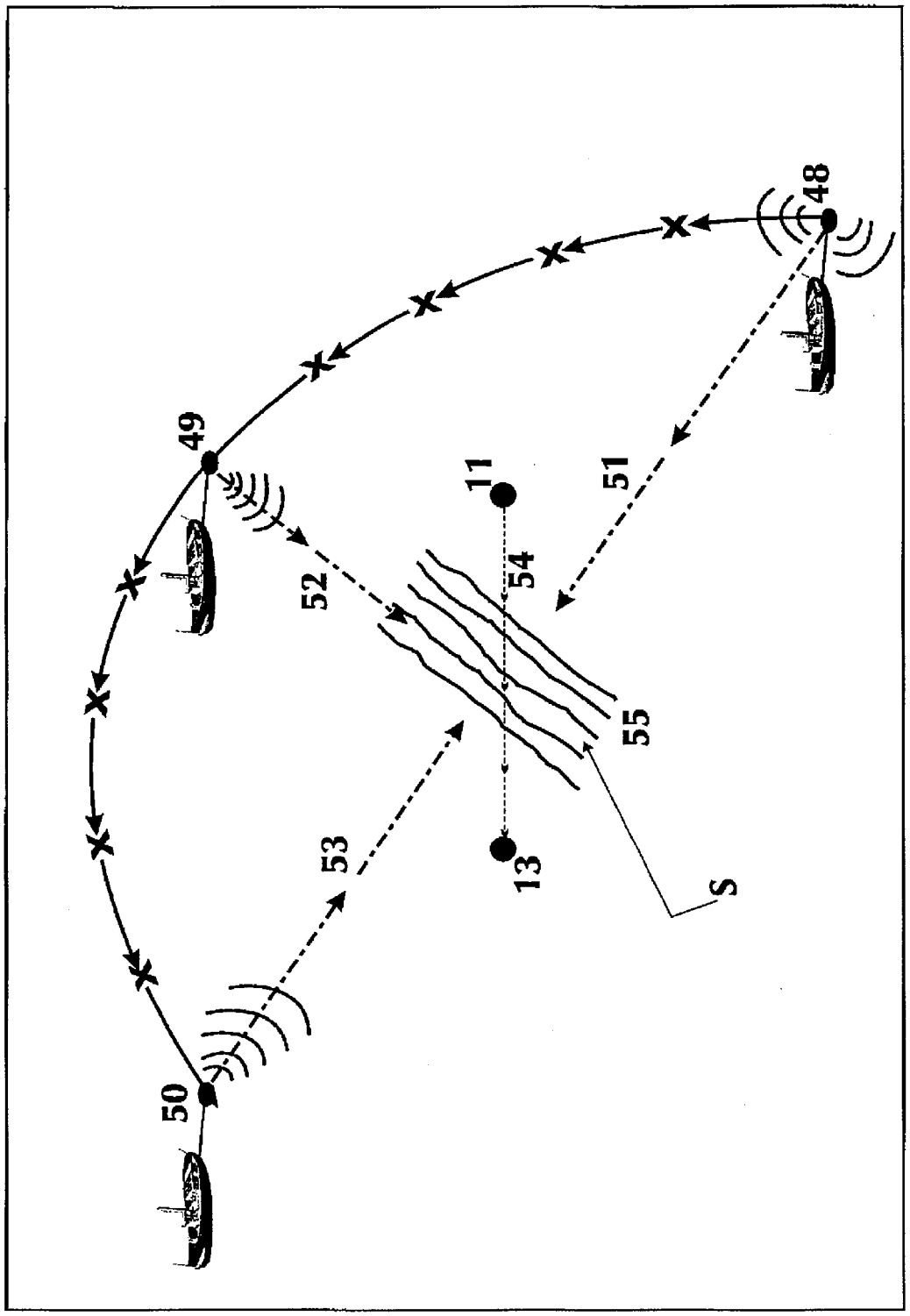
FIG. 7 is an illustrative schematic, which shows a plan view of the marine source deployment, in relation to the two wells being used for recording and the location and the orientation of the subsurface fractures.

FIG. 7 is a plan view of the source and receiver well locations, 11 and 13. The orientation of the fractures S is shown as 55. The travel path of the 'carrier' seismic signal transmitted from the well 11 and received by the receiver array is shown as 54. The surface source moves in a circular pattern at a predetermined offset, and recordings made at regular surface intervals. As explained earlier, when the marine surface source is in position 48, the energy travel path of the seismic acoustic pulse is at right angles to the orientation of the fractures, and maximum amplitude of the 'carrier' wave modulation exists. As the marine surface source moves at regular intervals in a circular pattern, the amplitude of the 'modulation' signal gradually is reduced until it becomes zero at source location 49. This source location, 49, identifies the energy travel path of the surface generated seismic impulse 52, which is parallel to the open subsurface fractures. The source moves along its circular pattern, until maximum 'modulation' signal is achieved again, at location 50. To get a better fix of the location of the fractures, surface source can be moved along the line between 48 and 50. By determining the arrival times T2, from the surface source to the fractures S, as shown by 39 in FIG. 5, and plotting its relative amplitude, the location and the orientation of the fractures can be determined. The method described in this patent is not limited to the marine surface source like water-gun or air-gun; it is equally valid for land surface seismic where the seismic impulse can be generated by using a weight drop or dynamite, these methods have been in use in the industry for many years and are well understood.

The measurement of a high frequency wave, when the open fractures in the reservoir formations are subjected to a relatively stronger lower frequency seismic impulse, provides an ideal method to map the orientation and location of the fractures in the reservoirs. The above described method is superior to the current techniques since this invention makes direct measurements of the transmission characteristics of the fractures rather than the indirect measurements of velocity and amplitude that provide ambiguous results.

Having described the invention above, various modifications of the techniques, procedure, material and equipment will be apparent to those in the art. It is intended that all such variations within the scope and spirit of the appended claims be embraced thereby.

Fracture detection is also important in construction and in determining the safety of the larger structures like dams. The method described in the invention can be applied for similar applications.

What is claimed is:

1. A method for mapping the open fractures in an earth subsurface formation between two wells, which have been drilled in that subsurface formation, using two seismic signals transmitted into the said formation, one high frequency seismic signal transmitted from within one wellbore and received in another wellbore, and the other a lower frequency seismic impulse generated and transmitted from the surface or near surface, both seismic signals synchronized in time, the interaction of the two transmitted signals as they propagate through the open fractures, received and recorded by the downhole receivers, the method comprising:

recording the time synchronized high frequency 'carrier' seismic signal transmitted by a downhole source in one wellbore, and recorded by a receiver array in another wellbore, recording this data set by moving the downhole source vertically at predetermined spacings to provide a complete coverage of the reservoir zone of interest by the source and receiver positions, use this data set as a 'reference' to monitor the interaction of the surface generated seismic impulse with the 'carrier' signal as both these signals propagate through the fractures;

recording a second data set where both the sources, one located at the surface or near surface, which generates a seismic acoustic pulse, and the other a downhole source located in a wellbore that transmits a high frequency 'carrier' seismic signal, are activated in synchronism and simultaneously;

the surface source deployed in a predetermined geometric pattern designed to detect the orientation and location of the open fractures in the reservoir space between the source and receiver wells.

2. The method in claim 1 further comprising:

determining the amplitude and the arrival time of the result of the interaction caused due to the elastic nonlinearity of the open fractures, between the 'carrier' seismic signal and the surface generated seismic impulse, as both signals propagate through the open fractures;

by subtracting the 'reference' signal from the signal recorded when both the surface and downhole sources are simultaneously activated, the result of the subtraction will provide a 'modulation-pulse' and its onset will determine the arrival time of the seismic impulse from the surface source location to the open fracture location, in addition to measuring the arrival times also measure the relative amplitude of this pulse.

3. The method in claim 1 further comprising:

the surface source is moved in a predetermined geometric pattern and a complete set of recordings, by activating both the sources simultaneously, is made at each surface location; from the recordings, the 'modulation-pulse' is extracted by subtracting the 'reference' signal, the arrival times and the relative amplitudes of the 'modulation-pulse' are measured for each individual surface source location.

4. The method in claim 1 further comprising:

making the measurements of the relative amplitudes of the 'modulation-pulse' when the surface source is kept at a fixed surface source location, and the downhole source is moved vertically to cover different reservoir formations, using this information to identify the fractured reservoir formation, since the maximum amplitude of the 'modulation-pulse' will be recorded when the downhole source and the downhole receiver are in the same subsurface reservoir formation, which is fractured.

5. The method in claim 1 further comprising:

determining the seismic velocity from the surface to the reservoir formations, by using the travel time of the seismic acoustic pulse from the surface source to the known receiver depth locations in the receiver well and integrating this velocity information with the sonic well logs of the source and receiver wells, and using this velocity data to convert the arrival times of the 'modulation-pulse' into distances from each surface location to the open fractures, once the distances from the different surface location to the fractures have been determined, using this information to calculate the location of the fractures in terms of the three dimensional coordinates.

6. The method in claim 1 further comprising:

plotting the relative amplitudes of the 'modulation-pulse', when the downhole source and the receiver are in located in the fractured formation, the relative amplitudes corresponding to all the surface locations of the surface seismic source, and identifying the surface locations where the amplitude of the 'modulation-pulse' becomes zero amplitude, the zero amplitude indicates that the direction of arrival of the surface generated seismic pulse is in the same plane as the fracture orientation, the surface seismic source is located directly above the fractures or located at a surface location where the seismic impulse is arriving parallel to the fractures.

7. The method in claim 1 further comprising:

calculating the orientation and the location of the open fractures using the two sets of information, the arrival times of the 'modulation-pulse' and the relative amplitudes of the same pulse, cross checking both the results to improve the final determination of the location and orientation of the open subsurface fractures.

8. A method of mapping the orientation and location of the subsurface open fractures between two wells that are drilled in the reservoir formations, by using a seismic vibratory source and by using a surface or near surface seismic source that generates an acoustic pulse, by measuring the interaction of the two signals as they simultaneously propagate through the open fractures which are elastically nonlinear, and by determining the arrival times and the relative amplitudes of the signal generated due to this nonlinear interaction, and using the arrival times and the relative amplitudes of this signal to calculate the location and the orientation of the subsurface open fractures, the surface source could be a marine vessel that generates a seismic impulse using air or water-guns, or a land surface source similar to weight drop, or a dynamite charge that is exploded on or near surface, this method is equally applicable to any land surface or marine source used in the industry.

* * * * *